United States Patent [19]

Stockton

[11] Patent Number: 5,608,958

[45] Date of Patent: Mar. 11, 1997

[54] GEAR BOX HOUSING FACE REPAIR

[75] Inventor: Elmer A. Stockton, Dallas, Tex.

[73] Assignee: UNC Artex, Inc., Addison, Tex.

[21] Appl. No.: 326,027

[22] Filed: Oct. 19, 1994

[51] Int. Cl.$^6$ ........................................................ B23P 6/00
[52] U.S. Cl. ................................. 29/402.11; 29/402.02; 29/402.18; 29/402.19; 29/463; 277/207 R
[58] Field of Search ............................. 29/402.02, 402.06, 29/402.11, 402.18, 402.19, 458, 463, 558, 888.011, 888.3; 277/180, 207 R, 213, 236

[56] References Cited

U.S. PATENT DOCUMENTS

| | | | |
|---|---|---|---|
| 3,201,725 | 8/1965 | Johnson | 29/463 |
| 3,656,769 | 4/1972 | Jelinek et al. | 277/207 R |
| 4,232,437 | 11/1980 | Fair | 29/888.011 |
| 4,535,996 | 8/1985 | Cardis et al. | 277/180 X |
| 5,203,066 | 4/1993 | McDonald | 29/402.11 |
| 5,385,354 | 1/1995 | Hagiwara et al. | 277/236 X |

*Primary Examiner*—S. Thomas Hughes
*Attorney, Agent, or Firm*—L. Dan Tucker

[57] ABSTRACT

The repair of a warped peripheral planar sealing surface commonly provided on gear box or similar complex housings comprises the machining of the entire sealing face of the housing to a planar configuration and then removing additional metal from the edges of the sealing face to accommodate an adhesive sealant to secure a metallic gasket to the component so that the exposed face of the metallic gasket is not only planar but is disposed at the same dimensional location as the original face.

3 Claims, 2 Drawing Sheets

GEAR BOX HOUSING FACE REPAIR

TECHNICAL FIELD OF THE INVENTION

The invention relates to the method of repair of the peripheral sealing face of a complex metallic component such as a gear box housing for aircraft jet engines. The method of repair results in a novel structure utilizing a metallic gasket adhesively secured to a machined surface of the metallic component under repair so that the exposed surface of the gasket is parallel within the applicable tolerance limits and is located at the dimensionally identical location of the original peripheral mating surface of the metallic component.

BACKGROUND OF THE INVENTION

In many industries where complex machinery is employed, it is common to form housings for enclosing a multitude of components, such as a gear box housing, in two parts which are originally formed as castings and then are machined to provide the desired internal configuration and a peripheral parallel mating surface on each component which are traversed by peripherally spaced bolt holes to receive bolts which effect the sealed securement of the two housing parts.

This technique is employed to manufacture gear box housings for aircraft jet engines with the exception that the castings are formed from a magnesium or aluminum alloy or other suitable material due to the necessity of minimizing the weight of the gear box housing. The shafts and gears mounted in such housing are normally lubricated by a continuous flow of lubricating oil. The slightest leakage between the peripheral mating faces of the two gear box housings not only permits the oil to leak out but may also permit external contaminants such as water to gain entrance to the interior of the gear box housing. More importantly, the gear box housing must maintain its sealed relationship through a wide range of temperatures. Temperatures of minus 50° F. are often encountered by jet aircraft flying at altitudes on the order of 30,000 feet. On the other hand, when the aircraft is on the ground and the ground temperature is 100° F., the temperature of the housing and its contained components may reach the level of 400° F. These extreme reversals of temperature, which occur every time the jet aircraft takes off or lands, impose substantial stresses on the gear box housing. Additionally, these stresses are amplified by stresses derived from the gear shafts which are mounted in bearings supported by machined bores within the gear box housing.

It is therefore fairly common for the peripheral mating surfaces of one or both of the gear box housings to warp and depart from their original condition of exact parallelism with each other, thus permitting leakage to develop. Furthermore, lubricating oils are subject to breakdown by the temperature cycles, producing compounds which attack the magnesium alloy from which the gear box castings are formed. These contaminants can result in corrosion of sealing surfaces within the casting, thus permitting undesired leakage of the internal hydraulic system. Leakage can also be caused by external corrosion as a result of exposure to the elements. Lastly, breakage of protruding bearing hubs integrally formed on the wall of the casting is not uncommon.

From the foregoing, it will be apparent that gear box housings for jet aircraft have a limited life, yet these housings are individually very expensive to manufacture due to their complexity. As illustrated in FIGS. 1A and 1B of the drawings, each half of the housing comprises a complex casting which is subjected to a multitude of machining operations to produce the various bearing bores identified in such figures. The total cost of a single front or rear housing is on the order of $20,000. There is a need, therefore, for a repair technique to restore the housing to its original machined condition without in any manner decreasing the strength or serviceability of the housing and accomplishing such repair for a figure on the order of $5,000 or less to provide a substantial economic incentive for repairing such complex metallic components rather than scrapping them.

SUMMARY OF THE INVENTION

This invention relates to a method for effecting the economic repair of the peripheral mating surfaces of a complex metallic component, such as a gear box housing for jet aircraft engines, when such housings are no longer serviceable due to warpage of the housing which effects a departure of the peripheral mating surfaces from the true parallel condition to which they were originally machined. It should be recognized that a warpage producing an out of parallel condition on the order of 0.002 to 0.005 inches is sufficient to result in leakage of the housing. Oil leakage from the gear box housing cannot be tolerated in a jet aircraft engine due to the fact that the entire oil supply is only on the order of approximately five gallons and leakage can reduce this supply to a sufficiently low level to effect the destruction of the bearings or gears within the housing, and the resultant failure of the aircraft engine.

The gear box housing having a warped mating surface is subjected to a machining operation to return the warped mating surface to a condition of true parallelism. When this condition is reached, additional metal is removed from the newly created mating surface to provide space for accommodating the addition of a metallic gasket or shim to replace the metal removed. Since such gasket can be made in various thicknesses, the machining is accomplished with a pre-selected gasket thickness in mind. The gasket can be made of any suitable material. Preferably, the gasket will be made of the same material as the housing so that it will have the same thermal expansion characteristics as the housing. Aluminum is a preferred material for forming the gasket. The thickness of the gasket should be substantially the same thickness as the material machined from the housing face in the first machining step.

Each of the peripheral mating surfaces of such gear box housings is provided with a plurality of peripherally spaced bolt holes for securing the front and rear housings together. The further machining operation performed on the mating surface being repaired reduces the height of those areas of the mating surface which lie externally of an annular rib around each bolt hole and a connecting rib extending between the adjacent bolt holes. In other words, a peripherally extending, upstanding rib is thus formed on the mating surface. The height of such rib is selected to conform to a desirable thickness for incorporation of an adhesive sealant.

An adhesive sealant is then applied around the periphery of the mating surface on both sides of the upstanding rib. The preselected metallic gasket or shim is then aligned with the upstanding rib and pressed firmly against such rib to extrude outwardly off such surface any of the adhesive sealant inadvertently deposited on the top surface of the rib. The metallic gasket is thus rigidly secured to the peripheral mating portion of the gear box housing being repaired and the exposed face of the metallic gasket will not only be parallel, due to its contact with the parallel outer face of the upstanding rib, but it will also be dimensionally located in exactly the same place as the peripheral mating surface provided on the gear box housing when it was initially manufactured.

This operation can be accomplished for a cost substantially less than the reproduction cost of a complex metallic component such as a gear box housing for jet aircraft engines, and, more importantly, the repaired component will not only be dimensionally accurate but will be equally as strong as the original component.

Further advantages and applications of this invention will be readily apparent to those skilled in the art from the following detailed description, taken in conjunction with the annexed sheets of drawings, on which is shown a preferred embodiment of the invention.

DESCRIPTION OF THE PREFERRED EMBODIMENT

Figures 1A, 1B:
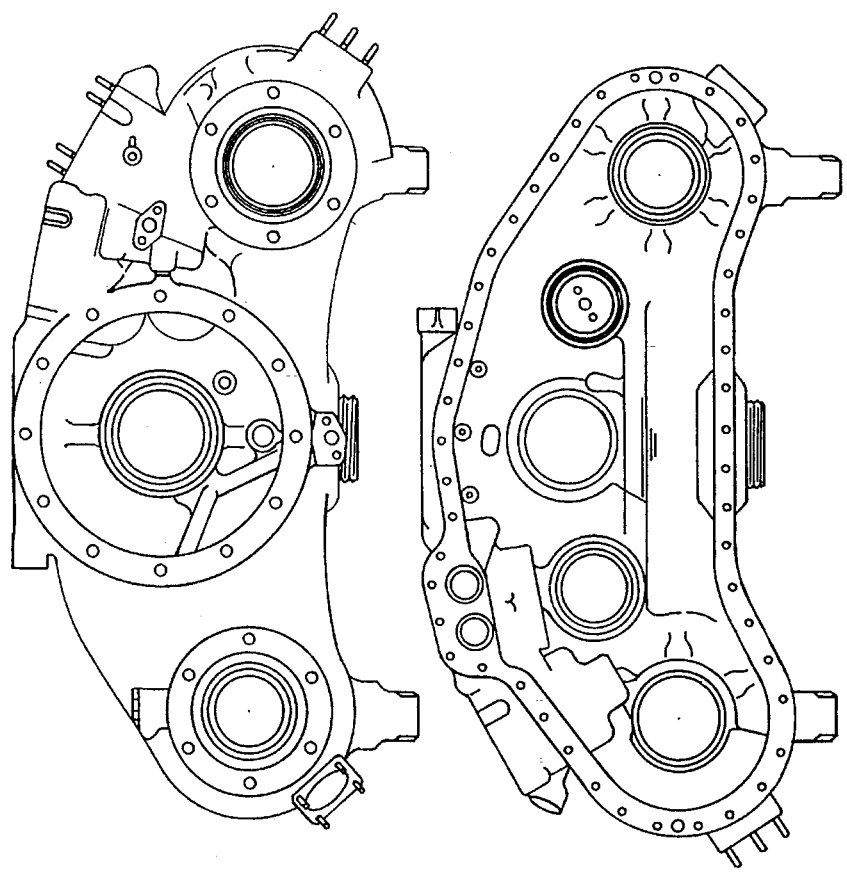
FIGS. 1A and 1B respectively represent top and bottom elevational views of a gear box housing for an aircraft jet engine, as employed in the prior art.

The prior art housing shown in FIGS. 1A and 1B is well known to those skilled in the art and need not be described in detail. It will be noted that each half of the housing is a complex casting, normally formed from a magnesium or aluminum alloy or other suitable material, and defines a plurality of bearing bores within its interior to accommodate various drive elements utilized in the gear box. Furthermore, the gear box housing half has a peripherally extending, planar mating surface which cooperates with a similarly shaped peripheral planar mating surface of the other housing half to form a sealed connection of the two housing halves by passing bolts through the peripherally spaced holes provided in the planar mating surfaces of both housings.

Let it be assumed that through usage, the planar mating surface has departed from its planar configuration so as to develop leakage and loss of dimensional accuracy when mated with a similar surface on the other housing half. The repair of such warped planar mating surfaces is accomplished by the following steps. First, the entire mating surface is machined to a planar configuration. This is not specifically shown in the drawings because it can be readily visualized by those skilled in the art. In other words, the warpage of the planar mating surface is eliminated.

The depth of this original machining operation is carded beyond the level required to effect a planar configuration, the total depth being selected to correspond exactly to the thickness of the metallic shim or gasket which will be applied to the housing to define the repaired peripheral mating surface. Thus, if the metal gasket thickness is on the order of 0.0125 inches, and only 0.010 inches is required to restore the planar mating surface to a condition of parallelism, the machining operation would be continued until 0.0125 inches is removed from the peripheral mating surface being repaired.

Figure 2:
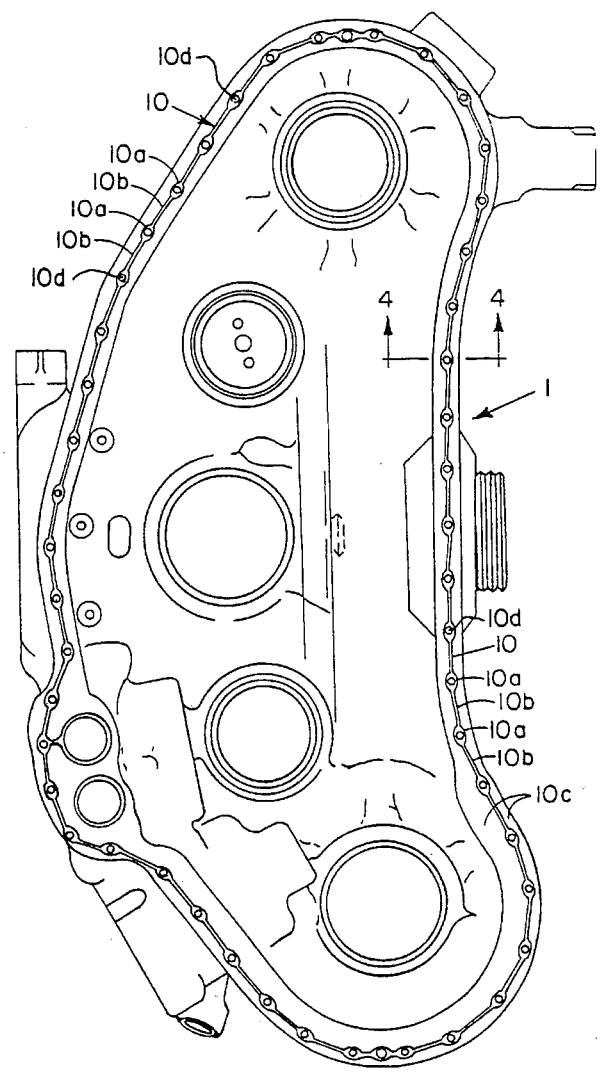
FIG. 2 is a view similar to FIG. 1B but illustrating the initial machining of the planar mating surface of the housing.
Figure 3:
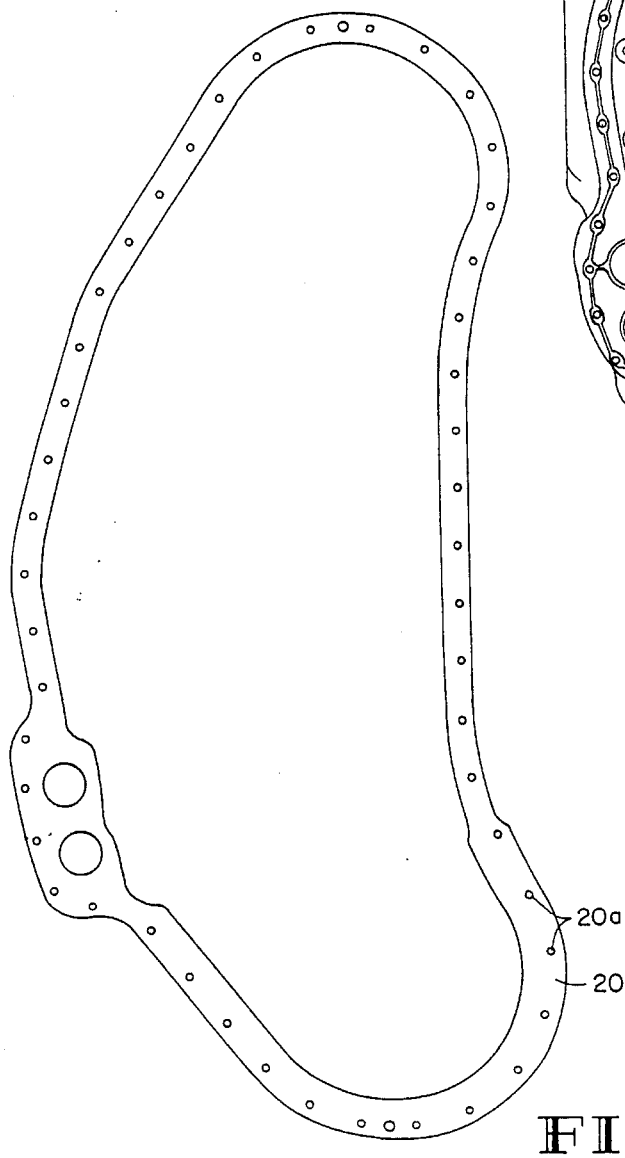
FIG. 3 is a plan view of a metallic gasket or shim utilized in the repair of the planar mating surface of the gear box housing.

Secondly, as illustrated in FIG. 2, a machining operation is performed on the interior and exterior edges of the new planar mating surface so as to define an upstanding rib 10 which extends peripherally around the entire planar mating surface and includes annular portions 10a surrounding each of the peripherally spaced bolt holes provided in the inset surface and a connecting rib portion 10b extending between all of the adjacent annular portions 10a, as best seen in FIG. 2. The depth of this machining operation is preferably 0.007 inches, but may vary within the range of 0.005 to 0.010 inches, depending on the specific bonding agent utilized.

The newly machined interior and exterior edge surfaces 10c of housing 1 are then coated with an adhesive sealant 25 (FIG. 4) so as to provide the desired depth of sealant. The adhesive sealant is selected from any of the known sealants that are resistant to temperature changes experienced in the operation of the repaired casting.

Figure 4:
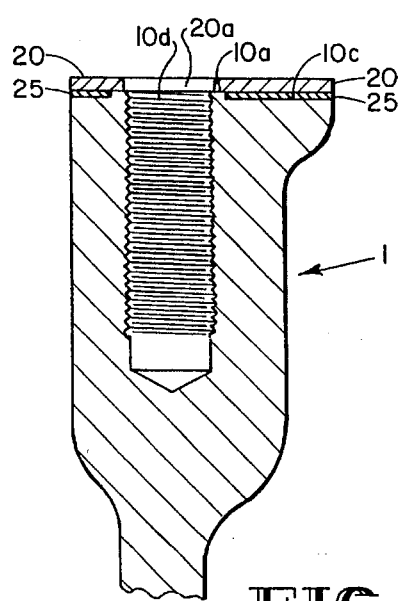
FIG. 4 is an enlarged scale sectional view taken on the plane 4—4 of FIG. 2 showing the completion of the repair of the planar mating surface of the gear box housing.

A thin metallic gasket or shim 20 having peripherally extending holes 20a formed therein to match the bolt holes 10d provided in the original mating surface is laid over the upstanding rib 10 and sealant 25, in the manner illustrated in FIG. 4. Pressure is applied to the metallic gasket to squeeze out any of the adhesive sealant which might have inadvertently been deposited on the top surface of the rib 10. Since the thickness of the metallic sealing gasket 20 has been selected to produce a return of the dimensional location of its top surface to the original dimensions of the planar mating surface as originally manufactured, it will be apparent that the warpage of the planar mating surface of the housing half has been eliminated and a new planar mating surface, constituting the top surface of the metallic gasket 20, has been positioned in the exact location of the planar mating surface of the housing as originally manufactured. Thus, a leak free seal can be obtained by bolting this new planar mating surface to the planar mating surface of the cooperating housing half.

It should be noted that upstanding rib 10 provides an incompressible surface on the housing mating surface which resists the compressive load produced by the bolts joining the housing halves. In addition, upstanding rib 10 provides a metal-to-metal seal between housing 1 and gasket 20. This metal-to-metal seal will prevent a rapid, catastrophic loss of lubricant from housing 10 in the event of a failure of sealant 25. Only a slow lubricant loss can be expected in the event of such sealant failure.

Obviously the aforedescribed operations can be accomplished at a cost significantly less than the cost of manufacturing the entire original housing, hence the economic advantages of this invention will be readily apparent to those skilled in the art.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit and scope of the described invention.

What is claimed and desired to be secured by Letters Patent is:

1. The method of repairing a metallic casting having a first peripheral planar mating surface machined thereon for sealing engagement with a similarly shaped second planar mating surface on another metallic component wherein said first peripheral planar mating surface has become sufficiently warped during usage to destroy the integrity of said sealing engagement; said first peripheral planar mating surface being traversed by a plurality of peripherally spaced bolt holes; comprising the steps of:

machining said first peripheral mating surface to restore the planar configuration thereof and thereby reducing the height of said first mating surface by a known dimension;

forming a thin metallic gasket to conform to said first peripheral mating surface and having holes respectively alignable with said bolt holes, said gasket having a thickness substantially equal to said known dimension;

further machining the edges of said first peripheral mating surface to uniformly reduce the height thereof in all areas except an annular area immediately adjacent each of said bolt holes and a narrow band area extending between all said annular areas adjacent each of said bolt holes, thereby defining an upstanding peripheral rib having a planar surface, the depth of this machining operation being selected to conform to a desired thickness of an adhesive sealant and the upstanding peripheral rib defining a gasket locating surface;

applying an adhesive sealant to said further machined edge areas;

aligning said metallic gasket with said bolt holes; and pressing the metallic gasket to intimately engage one surface thereof with said upstanding rib and said adhesive sealant, whereby the other surface of said metal gasket defines a peripheral planar mating surface corresponding in dimensions and location to said first peripheral planar mating surface as originally machined.

2. The method of claim 1, wherein said casting is an aircraft engine component which comprises a metallic alloy selected from the group consisting of magnesium and aluminum and said metallic gasket is formed of aluminum.

3. The method of claim 1, wherein said adhesive sealant is applied to all areas of the further machined areas and said pressing step comprises applying sufficient force to said metallic gasket to squeeze out any adhesive sealant disposed between said metallic gasket and said upstanding peripheral rib.

\* \* \* \* \*